June 24, 1930.    R. H. BROWN    1,765,786
CHILD'S COLLAPSIBLE VEHICLE
Filed Sept. 29, 1928    3 Sheets-Sheet 3
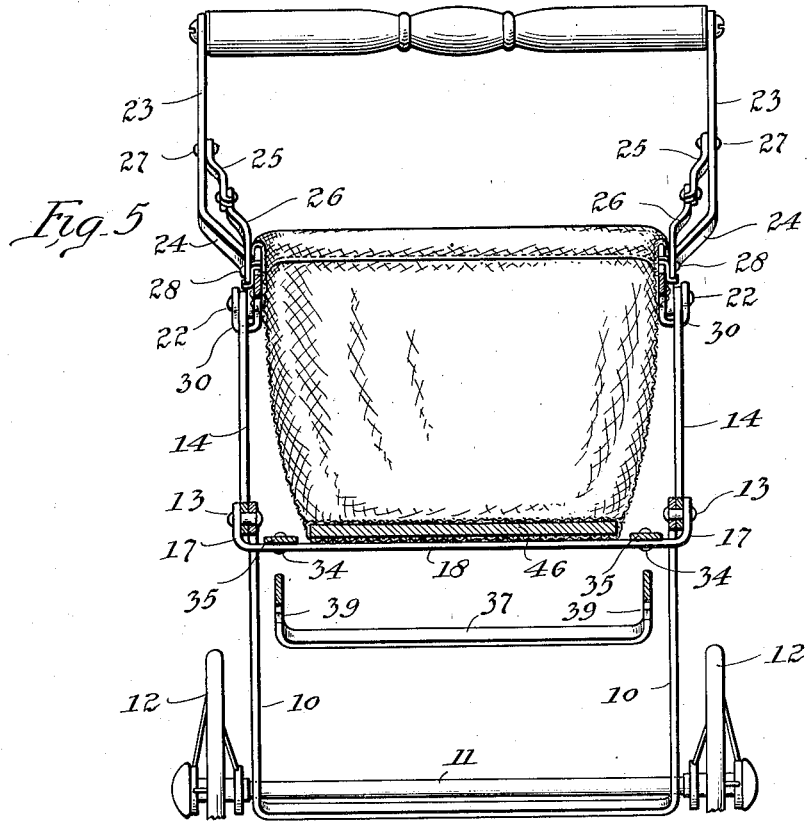
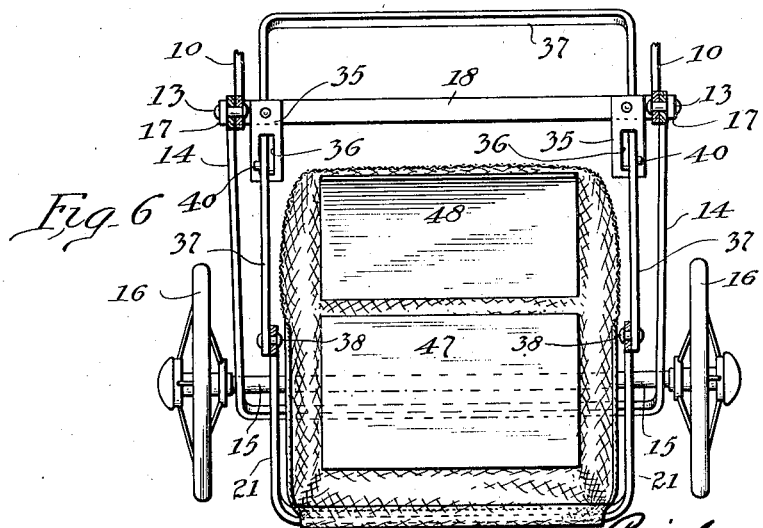
INVENTOR.
Reinhardt H. Brown,
BY John Howard McElroy
his ATTORNEY Patented June 24, 1930

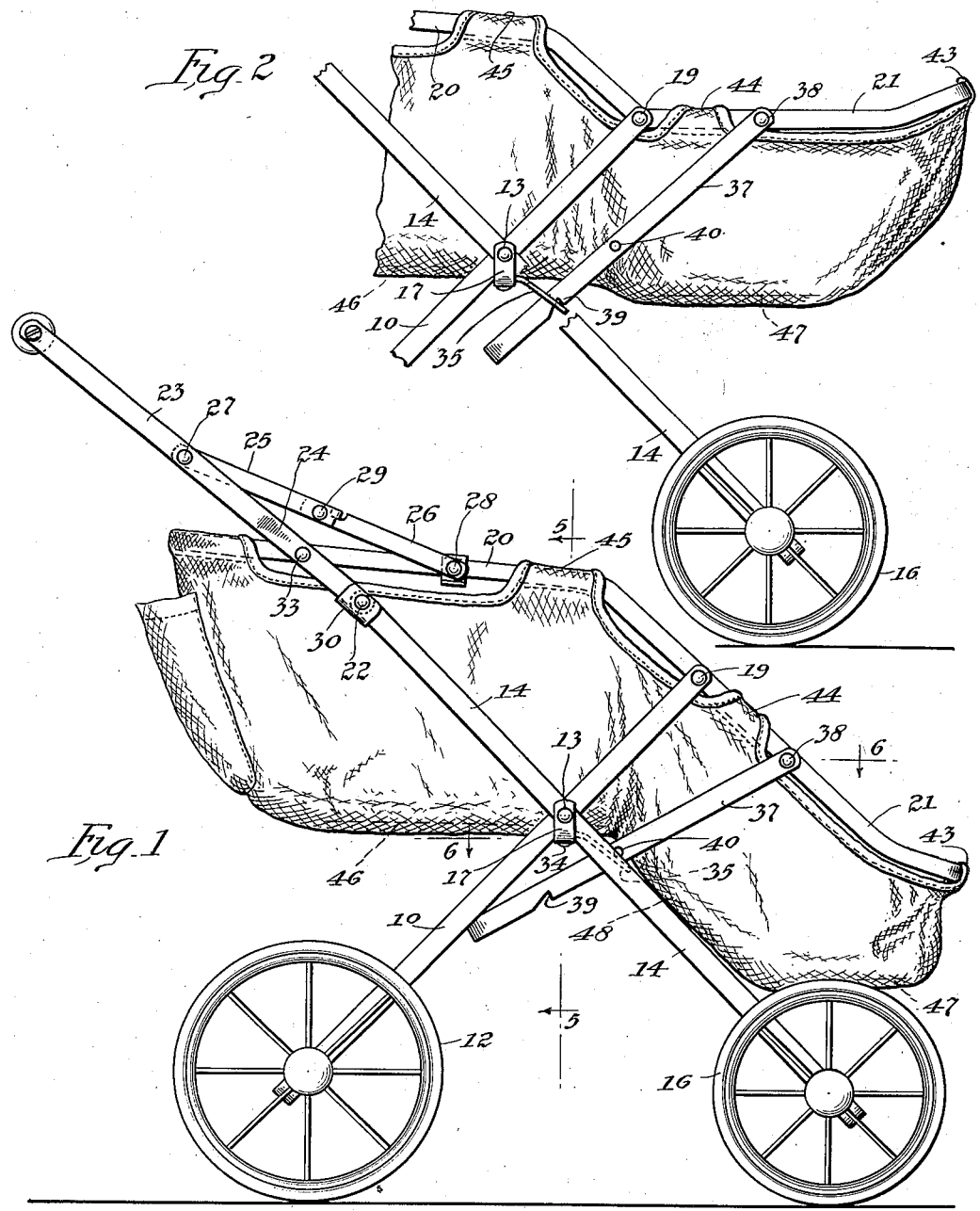

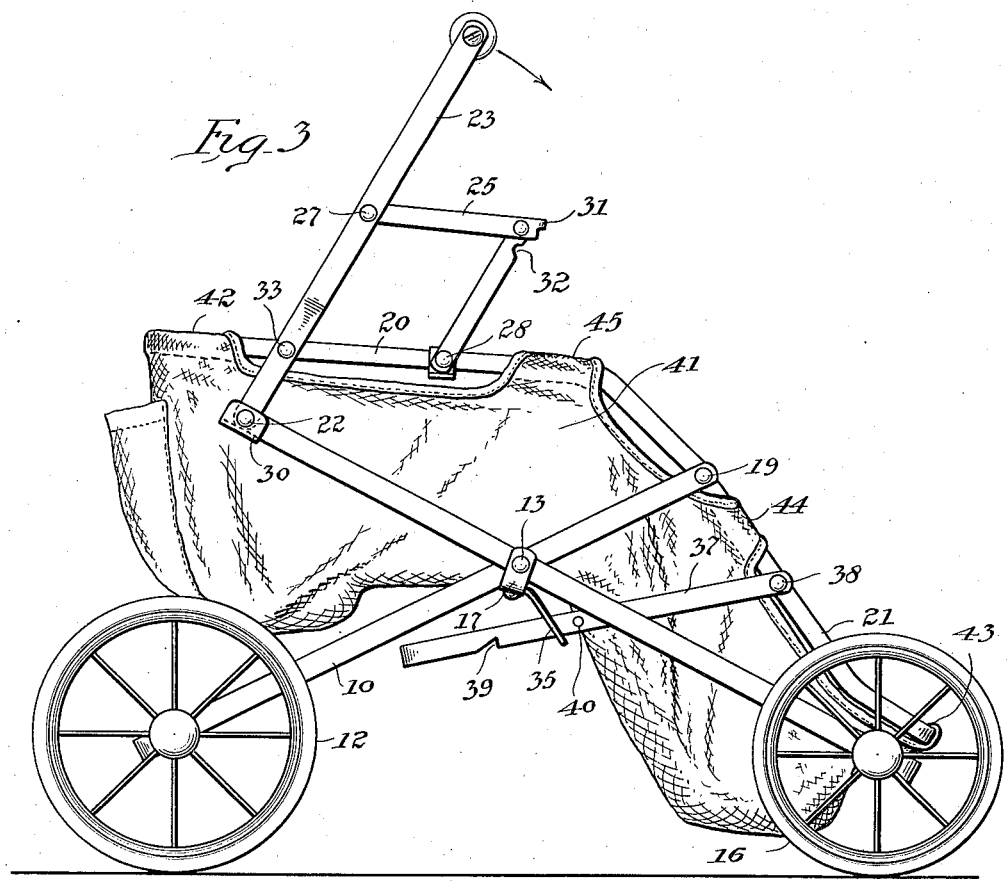
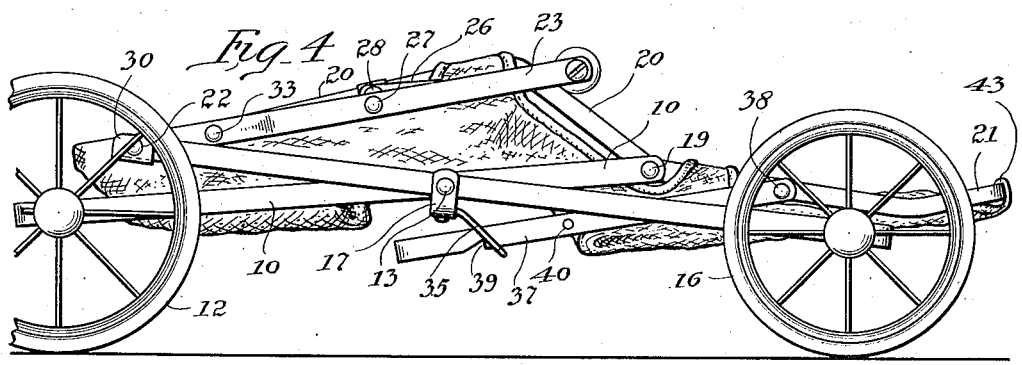

1,765,786

UNITED STATES PATENT OFFICE

REINHARDT H. BROWN, OF LA PORTE, INDIANA, ASSIGNOR TO JOHN HOWARD McELROY, TRUSTEE

CHILD'S COLLAPSIBLE VEHICLE

Application filed September 29, 1928. Serial No. 309,239.

My invention is concerned with children's vehicles of the type that can be (1) collapsed for transportation; (2) erected so as to form a trough or carriage in which babies can lie at full length; or (3) erected so as to form a seat and foot well in which the child able to sit up can be seated.

To these ends, it consists in a simple and novel construction, as is fully shown in the accompanying drawings, and hereinafter described, the novel features and combinations being particularly pointed out in the claims.

To illustrate my invention, I annex hereto three sheets of drawings, in which the same reference characters are used to designate identical parts in all the figures, of which,—

Fig. 1 is a side elevation showing the carriage erected for the child to sit in it;

Fig. 2 is a partial view similar to Fig. 1, but showing the body extended for the baby to lie down in it;

Fig. 3 is a view similar to Fig. 1, but with the device partially collapsed;

Fig. 4 is a side elevation of the device as collapsed;

Fig. 5 is a front elevation in section on line 5—5 of Fig. 1; and

Fig. 6 is a top plan view in section on the line 6—6 of Fig. 1.

In carrying out my invention in its preferred form, I preferably employ a generally U-shaped rear-wheel frame 10 made of a flat bar and supporting at the lower end thereof the axle bar 11, on the ends of which are journaled the pair of rear wheels 12. Pivotally connected by rivets 13 to the rear-wheel frame is a similar front-wheel frame 14 supporting the front-wheel axle 15, on the ends of which are journaled the pair of front wheels 16. Supported by the same pivots 13 are the upwardly turned ears 17 formed on the ends of a transverse bar 18 located directly below the pivots 13 and serving to limit the approach of the front and rear wheels 16 to each other. The upper, open end of the rear-wheel frame 10 is pivotally connected by the pivots 19 with the lower, open end of what I have called the main frame 20, preferably U-shaped, and with the open, upper end of the U-shaped foot-well frame 21. The upper end of the front-wheel frame 14 is pivotally connected by the pivots 22 with the lower ends of the handle frame 23, which preferably has the offsets 24 therein to widen the upper portion and to permit the pair of connecting links 25 and 26 (pivoted to the handle frame 23 by the rivets 27 and to the main frame 20 by the rivets 28, and to each other by the rivets 29) to be folded between said handle frame and the main frame 20 when the parts are collapsed, as seen in Fig. 4. To prevent the handle frame from collapsing when the parts are extended, as shown in Fig. 1, the joint at the pivots 22 is provided with a clip 30, U-shaped in cross section, which permits the handle frame 23 to be folded forwardly from the extended position, shown in Fig. 1, but which prevents said handle frame passing backward beyond said extended position. To the same end, the links 25, as best seen in Fig. 3, have at their forward ends the reduced portion 31 turned inwardly and co-operating with the recess 32 formed in the link 26, as will be readily apparent. The handle frame 23 is likewise pivoted toward its open, lower end by the pivots 33 to the main frame 20. The transverse bar 18 has secured thereto, preferably by the rivets 34, the ears 35 having slots 36 therein, best seen in Fig. 6, through which slots slide the sides of the U-shaped locking frame 37 pivoted by the pivots 38 to the sides of the foot-well frame 21. The locking frame 37 has formed in the sides thereof, toward the lower end, the detent recesses 39, and toward the middle portion thereof it has the abutment pins 40 projecting outwardly therefrom.

The body 41 is preferably formed of canvas or some similar flexible material, and has its rear upper end looped around the transverse portion of the main frame 20 at 42, and its lower front portion is similarly looped around the transverse portion of the foot-well frame 21 at 43. Its edges are likewise looped around the foot-well frame 21 and the main frame 20 at 44 and 45, respectively. To form a rigid seat when the body portion is in the sitting position, I place in the bottom of the body portion, between two layers of the flexible material, a rectangular, rigid seat-board 46, which, when the parts are in the position shown in Fig. 1, rests upon and is supported by the transverse bar 18. In the forward, lower end, I place the similar but narrower, rectangular, rigid board 47, upon which the child's feet rest, and between these boards 46 and 47, I may insert, in the bottom of the body fabric, a third board 48.

The operation of the apparatus will be readily apparent. When the parts are in the position shown in Fig. 1, the pins 40 engage the ears 35 and hold the foot well in its desired position, and prevent its swinging down too low. When it is desired to bring the parts into the position shown in Fig. 2, all that is necessary is to lift up on the foot-well frame until the parts are in the position shown in Fig. 2, when the notches 39 will engage the ears 35 and hold the foot-well frame in the raised position. When it is desired to collapse the vehicle for carrying it by hand, the lock formed by the links 25 and 26 has to be broken by lifting on either of said links, after which the handle frame is swung clockwise, as seen in Fig. 3, and this movement permits the wheels to move apart, and when the apparatus is completely collapsed, as shown in Fig. 4, it can be conveniently carried by grasping the body portion surrounding the transverse portion of either the main frame 20 or the foot-well frame 21.

While I have shown and described my invention as embodied in the form which I at present consider best adapted to carry out its purposes, it will be understood that it is capable of modification, and that I do not desire to be limited in the interpretation of the following claims except as may be necessitated by the state of the prior art.

What I claim as new, and desire to secure by Letters Patent of the United States, is:

1. In a collapsible vehicle, the combination with a generally U-shaped main frame, and a generally U-shaped foot-well frame, said frames being pivotally connected to each other at their open ends, of a rear-wheel frame pivotally connected at its upper end to said main and foot-well frames where they are pivotally connected, a front-wheel frame pivotally connected to said rear-wheel frame, a handle frame pivotally connected toward its open lower end to said main frame and at said open lower end to the upper end of the front-wheel frame, a flexible trough-like body connected at the top of its sides and ends to said main frame and foot-well frame, and means for holding said foot-well frame either in its generally horizontal position to form a trough-like holder or lowered for the occupant to take a sitting position, substantially as and for the purpose described.

2. In a collapsible vehicle, the combination with a generally U-shaped main frame, and a generally U-shaped foot-well frame, said frames being pivotally connected to each other at their open ends, of a rear-wheel frame pivotally connected at its upper end to said main and foot-well frames where they are pivotally connected, a front-wheel frame pivotally connected to said rear-wheel frame, a handle frame pivotally connected toward its open lower end to said main frame and at said open lower end to the upper end of the front-wheel frame, a flexible trough-like body connected at the top of its sides and ends to said main frame and foot-well frame, means for holding said foot-well frame either in its generally horizontal position to form a trough-like holder or lowered for the occupant to take a sitting position, and mechanism for holding the handle frame extending from the front-wheel frame in substantially the same plane.

3. In a collapsible vehicle, the combination with a generally U-shaped main frame, and a generally U-shaped foot-well frame, said frames being pivotally connected to each other at their open ends, of a rear-wheel frame pivotally connected at its upper end to said main and foot-well frames where they are pivotally connected, a front-wheel frame pivotally connected to said rear-wheel frame, a handle frame pivotally connected toward its open lower end to said main frame and at said open lower end to the upper end of the front-wheel frame, and means for holding said foot-well frame either in its generally horizontal position to form a trough-like holder or lowered for the occupant to take a sitting position, said means consisting of a generally U-shaped locking frame pivoted at its open end to the foot-well frame and having rocking recesses in the sides thereof cooperating with fixed abutments to hold the foot-well frame in its raised position.

4. In a collapsible vehicle, the combination with a generally U-shaped main frame and a generally U-shaped foot-well frame, said frames being pivotally connected to each other at their open ends, of a rear-wheel frame pivotally connected at its upper end to said main and foot-well frames where they are pivotally connected, a front-wheel frame pivotally connected to said rear-wheel frame, a handle frame pivotally connected toward its open lower end to said main frame and at said open lower end to the upper end of the front-wheel frame, and means for holding said foot-well frame either in its generally horizontal position to form a trough-like holder or lowered for the occupant to take a sitting position, said means consisting of a generally U-shaped locking frame pivoted at its open end to the foot-well frame and having locking recesses in the sides thereof cooperating with fixed abutments to hold the foot-well frame in its raised position, said locking frame having pins thereon likewise co-operating with the fixed abutments to hold the foot-well frame in its lowered position.

5. In a collapsible vehicle, the combination with a generally U-shaped main frame and a generally U-shaped foot-well frame, said frames being pivotally connected to each other at their open ends, of a rear-wheel frame pivotally connected at its upper end to said main and foot-well frames where they are pivotally connected, a front-wheel frame pivotally connected to said rear-wheel frame, a handle frame pivotally connected toward its open lower end to said main frame and at said open lower end to the upper end of the front-wheel frame, a flexible trough-like body connected at the top of its sides and ends to said main frame and foot-well frame, and a transverse bar having ears pivoted to the pivots connecting the two wheel frames and supporting the flexible body.

6. In a collapsible vehicle, the combination with a generally U-shaped main frame and a generally U-shaped foot-well frame, said frames being pivotally connected to each other at their open ends, of a rear-wheel frame pivotally connected at its upper end to said main and foot-well frames where they are pivotally connected, a front-wheel frame pivotally connected to said rear-wheel frame, a handle frame pivotally connected toward its open lower end to said main frame and at said open lower end to the upper end of the front-wheel frame, a transverse bar having ears pivoted to the pivots connecting the two wheel frames and engaging said frames to limit the approach of the wheels to each other, a pair of slotted ears supported by said transverse bar, and a U-shaped locking frame pivoted at its open upper end to the foot-well frame, sliding through said ears and having notches therein and abutments thereon co-operating with the ears to hold the foot well in either its raised or lowered position.

7. In a collapsible vehicle, the combination with a generally U-shaped main frame and a generally U-shaped foot-well frame, said frames being pivotally connected to each other at their open ends, of a rear-wheel frame pivotally connected at its upper end to said main and foot-well frames where they are pivotally connected, a front-wheel frame pivotally connected to said rear-wheel frame, a handle frame pivotally connected toward its open lower end to said main frame and at said open lower end to the upper end of the front-wheel frame, a flexible trough-like body connected at the top of its sides and ends to said main frame and foot-well frame, means for holding said foot-well frame either in its generally horizontal position to form a trough-like holder or lowered for the occupant to take a sitting position, and mechanism for holding the handle frame extending from the front-wheel frame in substantially the same plane, said mechanism consisting of a pair of links pivoted at their adjacent ends to each other and at their other ends to the handle frame and the main frame.

8. In a collapsible vehicle, the combination with a generally U-shaped main frame and a generally U-shaped foot-well frame, said frames being pivotally connected to each other at their open ends, of a rear-wheel frame pivotally connected at its upper end to said main and foot-well frames where they are pivotally connected, a front-wheel frame pivotally connected to said rear-wheel frame, a handle frame pivotally connected toward its open lower end to said main frame and at said open lower end to the upper end of the front-wheel frame, means for holding said foot-well frame either in its generally horizontal position to form a trough-like holder or lowered for the occupant to take a sitting position, and a flexible trough-like body portion depending from said main and foot-well frames, substantially as and for the purpose described.

9. In a collapsible vehicle, the combination with a generally U-shaped main frame and a generally U-shaped foot-well frame, said frames being pivotally connected to each other at their open ends, of a rear-wheel frame pivotally connected at its upper end to said main and foot-well frames where they are pivotally connected, a front-wheel frame pivotally connected to said rear-wheel frame, a handle frame pivotally connected toward its open lower end to said main frame and at said open lower end to the upper end of the front-wheel frame, a transverse bar having ears pivoted to the pivots connecting the two wheel frames and supporting the flexible body, and a flexible trough-like body portion depending from said main and foot-well frames and having rigid pads in the bottom thereof to serve as a seat and foot rest when the foot-well frame is in its lowered position.

10. In a collapsible vehicle, the combination with a generally U-shaped main frame and a generally U-shaped foot-well frame, said frames being pivotally connected to each other at their open ends, of a rear-wheel frame pivotally connected at its upper end to said main and foot-well frames where they are pivotally connected, a front-wheel frame pivotally connected to said rear-wheel frame, a handle frame pivotally connected toward its open lower end to said main frame and at said open lower end to the upper end of the front-wheel frame, a transverse bar having ears pivoted to the pivots connecting the two wheel frames and engaging said frames to limit the approach of the wheels to each other, and a flexible trough-like body portion depending from said main and foot-well frames and having a rigid pad in the bottom thereof to serve as a seat when the foot-well frame is in its lowered position, said pad resting in that case on the transverse bar.

11. In a collapsible vehicle, the combination with a normally-horizontal frame and a foot-well frame, said frames being pivotally connected to each other at their adjacent ends, of a rear-wheel frame pivotally connected at its upper end to said normally-horizontal and foot-well frames where they are pivotally connected and having rear wheels journaled on the lower ends thereof, a front-wheel frame pivotally connected to said rear-wheel frame and having front wheels journaled at the lower ends thereof, a flexible trough-like body connected to said normally-horizontal and foot-well frames, and connections between said front-wheel, rear-wheel, normally-horizontal and foot-well frames, whereby they may be held in either a collapsed or an erected position to form a trough-like holder or lowered for the occupant to take a sitting position, substantially as and for the purpose described.

12. In a collapsible vehicle, the combination with a normally-horizontal frame and a foot-well frame, said frames being pivotally connected to each other at their adjacent ends, of a rear-wheel frame pivotally connected at its upper end to said normally-horizontal and foot-well frames where they are pivotally connected and having rear wheels journaled on the lower ends thereof, a front-wheel frame pivotally connected to said rear-wheel frame and having front wheels journaled at the lower ends thereof, a flexible trough-like body connected to said normally-horizontal and foot-well frames, connections between said front-wheel, rear-wheel, normally-horizontal and foot-well frames, whereby they may be held in either a collapsed or an erected position to form a trough-like holder or lowered for the occupant to take a sitting position, and means for holding said foot-well frame in either its raised or its lowered position, substantially as and for the purpose described.

13. In a collapsible vehicle, the combination with a normally-horizontal frame and a foot-well frame, said frames being pivotally connected to each other at their adjacent ends, of a rear-wheel frame pivotally connected at its upper end to said normally-horizontal and foot-well frames where they are pivotally connected and having rear wheels journaled on the lower ends thereof, a front-wheel frame pivotally connected to said rear-wheel frame and having front wheels journaled at the lower ends thereof, a flexible trough-like body connected to said normally-horizontal and foot-well frames, connections between said front-wheel, rear-wheel, normally-horizontal and foot-well frames, whereby they may be held in either a collapsed or an erected position to form a trough-like holder or lowered for the occupant to take a sitting position, and a transverse bar having ears at its ends pivoted on the pivots connecting the wheel frames and serving to support the flexible body, substantially as and for the purpose described.

14. In a collapsible vehicle, the combination with a normally-horizontal frame and a foot-well frame, said frames being pivotally connected to each other at their adjacent ends, of a rear-wheel frame pivotally connected at its upper end to said normally-horizontally and foot-well frames where they are pivotally connected and having rear wheels journaled on the lower ends thereof, a front-wheel frame pivotally connected to said rear-wheel frame and having front wheels journaled at the lower ends thereof, a flexible trough-like body connected to said normally-horizontal and foot-well frames, connections between said front-wheel, rear-wheel, normally-horizontal and foot-well frames, whereby they may be held in either a collapsed or an erected position to form a trough-like holder or lowered for the occupant to take a sitting position, a transverse bar having ears at its ends pivoted on the pivots connecting the wheel frames and serving to support the flexible body, a U-shaped locking frame pivoted at its open end to the foot-well frame and having notches and abutments in the sides thereof, and a pair of apertured ears supported on said transverse bar and through which the sides of the locking frame slide, substantially as and for the purpose described.

15. In a collapsible vehicle, the combination with a normally-horizontal frame and a foot-well frame, said frames being pivotally connected to each other at their adjacent ends, of a rear-wheel frame pivotally connected at its upper end to said normally-horizontal and foot-well frames where they are pivotally connected, a front-wheel frame pivotally connected to said rear-wheel frame, a handle frame pivotally connected toward its open lower end to said normally-horizontal frame, and at said open lower end to the upper end of the front-wheel frame, a flexible trough-like body connected to said normally-horizontal and foot-well frames, and means for holding said foot-well frame either in its generally horizontal position to form a trough-like holder or lowered for the occupant to take a sitting position, substantially as and for the purpose described.

16. In a collapsible vehicle, the combination with a normally-horizontal frame and a foot-well frame, said frames being pivotally connected to each other at their adjacent ends, of a rear-wheel frame pivotally connected at its upper end to said normally horizontal and foot-well frames where they are pivotally connected, a front-wheel frame pivotally connected to said rear-wheel frame, a handle frame pivotally connected toward its open lower end to said normally-horizontal frame and at said open lower end to the upper end of the front-wheel frame, a flexible trough-like body connected to said normally-horizontal and foot-well frames, means for holding said foot-well frame either in its generally-horizontal position to form a trough-like holder or lowered for the occupant to take a sitting position, and mechanism for holding the handle frame extending from the front-wheel frame in substantially the same plane, substantially as and for the purpose described.

17. In a collapsible vehicle, the combination with a normally-horizontal frame and a foot-well frame, said frames being pivotally connected to each other at their adjacent ends, of a rear-wheel frame pivotally connected at its upper end to said normally-horizontal and foot-well frames where they are pivotally connected, a front-wheel frame pivotally connected to said rear-wheel frame, a handle frame pivotally connected toward its open lower end to said normally-horizontal frame and at said open lower end to the upper end of the front-wheel frame, a flexible trough-like body connected to said normally-horizontal and foot-well frames, means for holding said foot-well frame either in its generally-horizontal position to form a trough-like holder or lowered for the occupant to take a sitting position, and a transverse bar having ears pivoted to the pivots connecting the two wheel frames and supporting the flexible body, substantially as and for the purpose described.

In witness whereof, I have hereunto set my hand this 27th day of September, 1928.

REINHARDT H. BROWN.